United States Patent
Park et al.

(10) Patent No.: US 9,256,049 B2
(45) Date of Patent: Feb. 9, 2016

(54) LENS DRIVING APPARATUS

(71) Applicant: LG INNOTEK CO., LTD., Seoul (KR)

(72) Inventors: Sang Ok Park, Gwangju (KR); Sang Jun Min, Gyeonggi-do (KR); Sang Hee Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/632,758

(22) Filed: Feb. 26, 2015

(65) Prior Publication Data

US 2015/0168670 A1     Jun. 18, 2015

Related U.S. Application Data

(63) Continuation of application No. 13/952,230, filed on Jul. 26, 2013, now Pat. No. 9,019,624, which is a continuation of application No. 13/659,185, filed on Oct. 24, 2012, which is a continuation of application (Continued)

(30) Foreign Application Priority Data

Dec. 13, 2006    (KR) ........................ 10-2006-0127435
Dec. 13, 2006    (KR) ........................ 10-2006-0127436

(51) Int. Cl.
    *G02B 7/02*          (2006.01)
    *G02B 7/04*          (2006.01)
    (Continued)

(52) U.S. Cl.
    CPC ................ *G02B 7/04* (2013.01); *E21B 36/001* (2013.01); *G02B 7/023* (2013.01); *G02B 7/026* (2013.01); *G03B 13/34* (2013.01); *H02K 41/0356* (2013.01)

(58) Field of Classification Search
CPC ........................................................ G02B 1/00
USPC .......................................... 359/814, 824, 694
See application file for complete search history.

(56) References Cited

U.S. PATENT DOCUMENTS

| | | |
|---|---|---|
| 5,471,100 A | 11/1995 | Sakamoto et al. |
| 6,034,940 A | 3/2000 | Lee |

(Continued)

FOREIGN PATENT DOCUMENTS

| | | |
|---|---|---|
| CN | 1504822 A | 6/2004 |
| CN | 1713015 A | 12/2005 |

(Continued)

OTHER PUBLICATIONS

Office Action dated Nov. 1, 2011 in Japanese Application No. 2009-541226, filed Dec. 12, 2007.

(Continued)

*Primary Examiner* — James Jones
(74) *Attorney, Agent, or Firm* — Saliwanchik, Lloyd & Eisenschenk

(57) ABSTRACT

Disclosed is a lens driving apparatus. The lens driving apparatus includes a base formed at a center thereof with a first opening; a housing coupled with the base and having a second opening corresponding to the first opening; a yoke installed on the base and including a horizontal plate having a third opening corresponding to the first opening and a vertical plate protruding upward from the horizontal plate; a bobbin movably installed in the yoke and coupled with a lens module; a coil fixedly disposed around the bobbin; a plurality of magnets provided at the vertical plate of the yoke to face the coil; and a spring installed on at least one of upper and lower portions of the yoke to return the bobbin, which has moved up due to interaction between the magnet and the coil, to its initial position.

25 Claims, 2 Drawing Sheets

Related U.S. Application Data

No. 13/302,547, filed on Nov. 22, 2011, now Pat. No. 8,300,330, which is a continuation of application No. 13/051,291, filed on Mar. 18, 2011, now Pat. No. 8,089,703, which is a continuation of application No. 12/518,976, filed as application No. PCT/KR2007/006466 on Dec. 12, 2007, now Pat. No. 7,936,526.

(51) Int. Cl.
*H02K 41/035* (2006.01)
*E21B 36/00* (2006.01)
*G03B 13/34* (2006.01)

(56) References Cited

U.S. PATENT DOCUMENTS

| | | |
|---|---|---|
| 6,591,066 B2 | 7/2003 | Aoshima |
| 6,710,563 B2 | 3/2004 | Mizumaki et al. |
| 6,800,970 B2 | 10/2004 | Aoshima |
| 7,298,562 B2 | 11/2007 | Sue et al. |
| 7,649,703 B2 | 1/2010 | Shiraki et al. |
| 2004/0130808 A1 | 7/2004 | Yoneyama et al. |
| 2005/0286352 A1 | 12/2005 | Inui |
| 2006/0028929 A1 | 2/2006 | Osaka |
| 2006/0034599 A1 | 2/2006 | Osaka |
| 2006/0181632 A1 | 8/2006 | Makii et al. |
| 2006/0181748 A1 | 8/2006 | Makii et al. |
| 2006/0214520 A1 | 9/2006 | Tseng |
| 2006/0245085 A1 | 11/2006 | Lee et al. |
| 2006/0275032 A1 | 12/2006 | Hong et al. |
| 2007/0159010 A1 | 7/2007 | Su et al. |
| 2007/0247539 A1 | 10/2007 | Ho et al. |
| 2008/0117536 A1 | 5/2008 | Higuchi |
| 2009/0237815 A1 | 9/2009 | Kim |

FOREIGN PATENT DOCUMENTS

| | | | |
|---|---|---|---|
| DE | 202006009115 U1 | 8/2006 | |
| JP | 62-125545 A | 6/1987 | |
| JP | 10-334493 A | 12/1998 | |
| JP | 2000-275490 A | 10/2000 | |
| JP | 2005-128405 A | 5/2005 | |
| JP | 2005-234089 A | 9/2005 | |
| JP | 2005-258355 A | 9/2005 | |
| JP | 2006-079072 A | 3/2006 | |
| JP | 3124292 U | 7/2006 | |
| JP | 2006-234866 A | 9/2006 | |
| JP | 2008-026431 A | 2/2008 | |
| KR | 10-0649638 B1 | 11/2006 | |
| KR | WO2008063019 * | 5/2008 | ............. H02K 33/18 |
| TW | 200622466 A | 7/2006 | |
| TW | I265668 B | 11/2006 | |
| WO | WO-2005/088153 A1 | 9/2005 | |

OTHER PUBLICATIONS

Office Action dated Apr. 23, 2012 in Korean Application No. 10-2006-0127435, filed Dec. 13, 2006.

Office Action dated Apr. 23, 2012 in Korean Application No. 10-2006-0127436, filed Dec. 13, 2006.

Notice of Allowance dated Oct. 30, 2012 in Korean Application No. 10-2006-0127435, filed Dec. 13, 2006.

Patent Certificate dated May 8, 2013 in Chinese Application No. 200780049087.X, filed Dec. 12, 2007.

Office Action dated Jul. 16, 2013 in Taiwanese Patent Application No. 096147552, filed Dec. 12, 2007.

Office Action dated Feb. 21, 2014 in Taiwanese Application No. 102139064.

Office Action dated Feb. 3, 2015 in Chinese Patent Application No. 201310119692.7.

* cited by examiner

LENS DRIVING APPARATUS

CROSS-REFERENCE TO RELATED APPLICATIONS

This application is a continuation of U.S. application Ser. No. 13/952,230, filed Jul. 26, 2013; which is a continuation of U.S. application Ser. No. 13/659,185, filed Oct. 24, 2012; which is a continuation of U.S. application Ser. No. 13/302,547, filed Nov. 22, 2011, now U.S. Pat. No. 8,300,330, issued Oct. 30, 2012; which is a continuation of U.S. application Ser. No. 13/051,291, filed Mar. 18, 2011, now U.S. Pat. No. 8,089,703, issued Jan. 3, 2012; which is a continuation of U.S. application Ser. No. 12/518,976, filed Jun. 12, 2009, now U.S. Pat. No. 7,936,526, issued May 3, 2011; which is the U.S. national stage application of International Patent Application No. PCT/KR2007/006466, filed Dec. 12, 2007; which claims priority to Korean Patent Application Nos. 10-2006-0127435, filed Dec. 13, 2006, and 10-2006-0127436, filed Dec. 13, 2006, all of which are incorporated herein by reference in their entirety.

TECHNICAL FIELD

The present invention relates to a lens driving apparatus.

BACKGROUND ART

Recently, as electronic appliances have multi-functions, various electronic appliances having cameras therein, such as MP3 players, mobile communication terminals and PDAs, have been widely used.

Since the electronic appliances equipped with cameras are manufactured in a small size such that a user can carry the electronic appliances, parts for providing camera functions must also be manufactured in a small size. To this end, a dead space must be minimized in a lens driving apparatus that drives a lens of the camera.

TECHNICAL PROBLEM

The embodiment provides a lens driving apparatus which can be fabricated in a small size. The embodiment provides a lens driving apparatus in which a dead space is minimized.

TECHNICAL SOLUTION

The lens driving apparatus of the embodiment comprises a base formed at a center thereof with a first opening; a housing coupled with the base and having a second opening corresponding to the first opening; a yoke installed on the base and including a horizontal plate having a third opening corresponding to the first opening and a vertical plate protruding upward from the horizontal plate; a bobbin movably installed in the yoke and coupled with a lens module; a coil fixedly disposed around the bobbin; a plurality of magnets provided at the vertical plate of the yoke to face the coil; and a spring installed on at least one of upper and lower portions of the yoke to return the bobbin, which has moved up due to interaction between the magnet and the coil, to its initial position.

ADVANTAGEOUS EFFECTS

The embodiment can provide a lens driving apparatus which can be fabricated in a small size.

The embodiment can provide a lens driving apparatus in which a dead space is minimized.

DETAILED DESCRIPTION

Hereinafter, a lens driving apparatus according to an embodiment will be described with reference to accompanying drawings.

Figure 1:
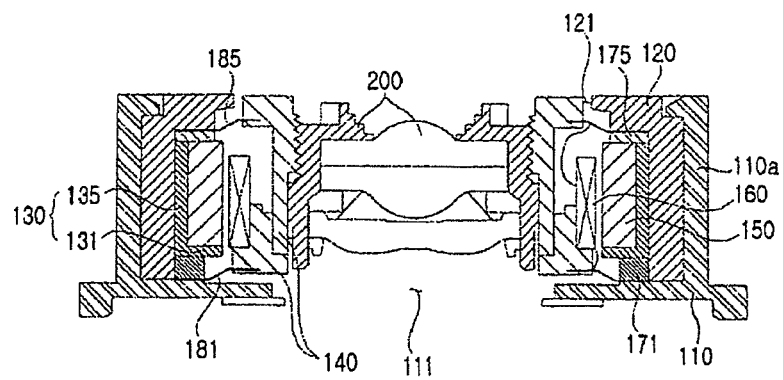
FIG. 1 is a sectional view of a lens driving apparatus according to a first embodiment.
Figure 2:
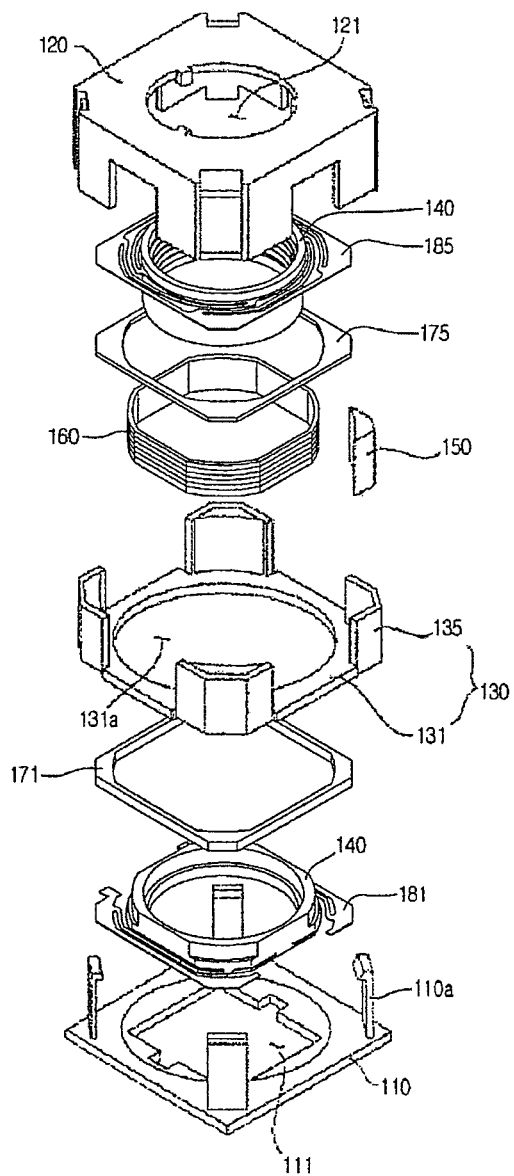
FIG. 2 is an exploded perspective view of the lens driving apparatus shown in FIG. 1.

FIG. 1 is a sectional view of a lens driving apparatus according to a first embodiment, and FIG. 2 is an exploded perspective view of the lens driving apparatus shown in FIG. 1.

Referring to FIGS. 1 and 2, the lens driving apparatus includes a base 110 and a housing 120, which are coupled to each other to form a predetermined space therebetween. The base 110 has a polygonal shape (e.g. rectangular plate shape) and a first opening 111 is formed at the center of the base 110. The housing 120 has a hexahedral structure and a bottom surface thereof is opened. Coupling members 110*a* are provided at corner edges of the base 110. The coupling members 110*a* protrude upward from the base 110 and are coupled with the housing 120 while making contact with an outer surface and an upper surface of the housing 120.

A second opening 121 is formed in the upper surface of the housing 120 corresponding to the first opening 111 of the base 110. The bottom surface of the base 110 is connected to an electronic appliance (not shown) and a circuit board (not shown) having an image sensor is provided in the first opening 111.

A metal yoke 130 is fixedly disposed between the base 110 and the housing 120. The yoke 130 includes a horizontal plate 131, which has a polygonal shape (e.g. rectangular plate shape) corresponding to the base 110 and is mounted on the base 110, and a vertical plate 135 provided at an outer peripheral portion of the horizontal plate 131 in correspondence with the outer peripheral portion of the housing 120.

A third opening 131*a*, which corresponds to the first opening 111 of the base 110, is formed in the horizontal plate 131, and the vertical plate 135 protrudes upward from the outer peripheral portion of the horizontal plate 131.

Since the yoke 130 has a rectangular shape corresponding to the shape of the base 110 and the housing 120 and is installed between the base 110 and the housing 120, a dead space may not exist among the base 110, the housing 120 and the yoke 130, and the yoke 130 may not rotate between the base 110 and the housing 120.

A cylindrical bobbin 140 is installed in the yoke 130. The bobbin 140 is movable up and down through the second opening 121. A lens module 200 including a lens and a lens supporter is coupled with the bobbin 140.

A magnet 150 having an angular column structure is fixed to an inner surface of the vertical plate 135 of the yoke 130, and a coil 160 is disposed around the bobbin 140.

The coil 160 has a cylindrical structure or a polygonal structure and faces the magnet 150.

In the embodiment, the coil 160 has a substantially octagonal structure, in which edges of the coil 160 facing the magnet 150 are curved.

At this time, planes of the magnet 150 that face the coil 160 are also curved such that the electromagnetic field can be maximized. That is, the planes of the coil 160 and the magnet 150, which face to each other, have the same curvature.

In the embodiment, a plurality of magnets 150 are disposed at edges of the yoke 130 to minimize the space occupied by the magnet 150.

Therefore, in the outer peripheral surface of the coil 160, an area that faces the magnets 150 is smaller than an area that does not face the magnets 150. In detail, the area that faces the magnets 150 is greater than 20% and smaller than 50% in the outer peripheral surface of the coil 160.

If the area that faces the magnets 150 is less than 20% in the outer peripheral surface of the coil 160, magnetic force is too insufficient to move up the coil 160. In addition, if the area that faces the magnets 150 is greater than 50% in the outer peripheral surface of the coil 160, the space occupied by the magnets 150 is too large.

According to the embodiment, in order to increase the magnetic force while reducing the space occupied by the magnets 150, the magnet 150 has an angular column structure in which a plane of the magnet 140 that faces the coil 160 is curved.

Therefore, the magnet 150 has later faces including a curved plane that faces the coil 160 and at least one flat plane that does not face the coil 160. In the embodiment, the magnet 150 includes one curved plane and three flat planes.

Thus, as current is applied to the coil 160, the coil 160 moves up together with the bobbin 140 due to an electric field generated from the coil 160 and a magnetic field generated from the magnet 150. Accordingly, the lens module 200 coupled with the bobbin 140 is also moved up.

First and second spacers 171 and 175 are installed between a bottom surface of the yoke 130 and the base 110 and between the upper surface of the yoke 130 and the housing 120, respectively. The first and second spacers 171 and 175 have elasticity to compensate for the assembling tolerance between the parts.

In addition, outer peripheral portions of first and second springs 181 and 185 having ring shapes are inserted between the bottom surface of the first spacer 171 and the base 110 and between the upper surface of the second spacer 175 and the housing 120, respectively.

Inner peripheral portions of the first and second springs 181 and 185 are integrally formed with the bobbin 140. As the current being applied to the coil 150 is shut off, the bobbin 140 is moved down by the first and second springs 181 and 185, so that the bobbin 140 returns to its initial position.

Although the embodiment shows the first and second springs 181 and 185, it is also possible to provide only one of the first and second springs 181 and 185.

Figure 3:
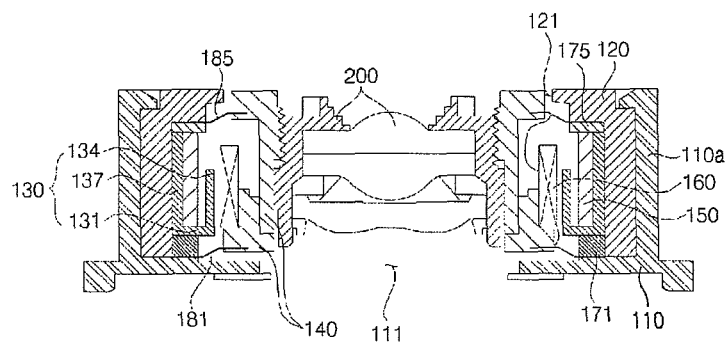
FIG. 3 is a sectional view of a lens driving apparatus according to a second embodiment.
Figure 4:
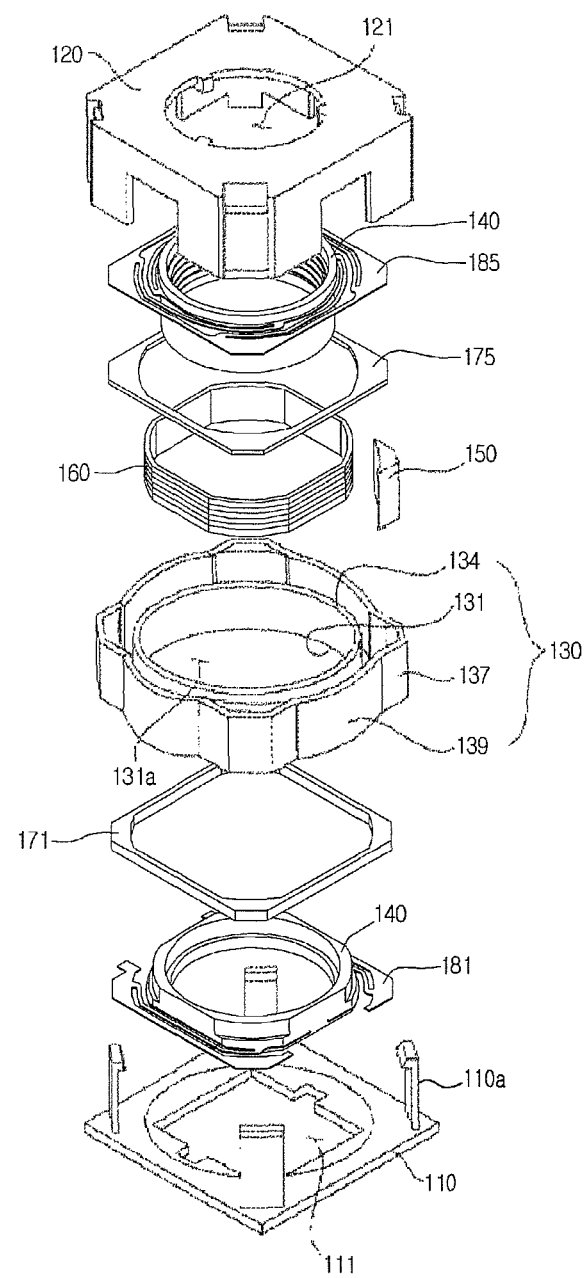
FIG. 4 is an exploded perspective view of the lens driving apparatus shown in FIG. 3.

FIG. 3 is a sectional view of a lens driving apparatus according to a second embodiment, and FIG. 4 is an exploded perspective view of the lens driving apparatus shown in FIG. 3.

Referring to FIGS. 3 and 4, the lens driving apparatus includes a base 110 and a housing 120, which are coupled to each other to form a predetermined space therebetween. The base 110 has a rectangular plate shape and a first opening 111 is formed at the center of the base 110. The housing 120 has a hexahedral structure and a bottom surface thereof is opened.

Coupling members 110*a* are provided at corner edges of the base 110. The coupling members 110*a* protrude upward from the base 110 and are coupled with the housing 120 while making contact with an outer surface and an upper surface of the housing 120.

A second opening 121 is formed in the upper surface of the housing 120 corresponding to the first opening 111 of the base 110. The bottom surface of the base 110 is connected to an electronic appliance (not shown) and a circuit board (not shown) having an image sensor is provided in the first opening 111.

A metal yoke 130 is fixedly disposed between the base 110 and the housing 120. The yoke 130 includes a horizontal plate 131, which has a rectangular plate shape corresponding to the base 110 and is mounted on the base 110.

A third opening 131 *a*, which corresponds to the first opening 111 of the base 110, is formed at the center of the horizontal plate 131. In addition, a ring-shaped vertical wall 134 is formed on the horizontal plate 131 while surrounding the third opening 131*a* and vertical plates 134 protrude upward from corner edges of the horizontal plate 131. The vertical plates 137 are fixedly supported by edges of the housing 120.

Since the yoke 130 has a rectangular shape corresponding to the shape of the base 110 and the housing 120 and is installed between the base 110 and the housing 120, a dead space may not exist among the base 110, the housing 120 and the yoke 130, and the yoke 130 may not rotate between the base 110 and the housing 120.

A cylindrical bobbin 140 is installed at an inner portion of the vertical wall 134 of in the yoke 130. The bobbin 140 is movable up and down through the second opening 121. A lens module 200 including a lens and a lens supporter is coupled with the bobbin 140.

A magnet 150 having an angular column structure is fixed to an inner surface of the vertical plate 137 of the yoke 130, and a coil 160 is disposed around the bobbin 140. The coil 160 has a cylindrical structure or a polygonal structure and faces the vertical wall 134.

In the embodiment, the coil 160 has a substantially octagonal structure, in which edges of the coil 160 facing the magnet 150 are curved.

At this time, a plane of the magnet 150, which is arranged sequentially to the vertical wall 134, is curved corresponding to the curvature of the coil 160 and the vertical wall 134 such that the electromagnetic field can be maximized. That is, the coil 160, the plane of the magnet 150 facing the coil 160, and the vertical wall 134 have the same curvature.

In the embodiment, a plurality of magnets 150 are disposed at edges of the yoke 130 to minimize the space occupied by the magnet 150.

Therefore, in the outer peripheral surface of the coil 160, an area that faces the magnets 150 is smaller than an area that does not face the magnets 150. In detail, the area that faces the magnets 150 is greater than 20% and smaller than 50% in the outer peripheral surface of the coil 160.

If the area that faces the magnets 150 is less than 20% in the outer peripheral surface of the coil 160, magnetic force is too insufficient to move up the coil 160. In addition, if the area that faces the magnets 150 is greater than 50% in the outer peripheral surface of the coil 160, the space occupied by the magnets 150 is too large.

According to the embodiment, in order to increase the magnetic force while reducing the space occupied by the magnets 150, the magnet 150 has an angular column structure in which a plane of the magnet 140 that faces the coil 160 is curved.

Therefore, the magnet 150 has later faces including a curved plane that faces the coil 160 and at least one flat plane that does not face the coil 160. In the embodiment, the magnet 150 includes one curved plane and three flat planes.

Thus, as current is applied to the coil 160, the coil 160 moves up together with the bobbin 140 due to an electric field generated from the coil 160 and a magnetic field generated from the magnet 150. Accordingly, the lens module 200 coupled with the bobbin 140 is also moved up.

First and second spacers 171 and 175 are installed between a bottom surface of the yoke 130 and the base 110 and between the upper surface of the yoke 130 and the housing 120, respectively. The first and second spacers 171 and 175 have elasticity to compensate for the assembling tolerance between the parts.

In addition, outer peripheral portions of first and second springs 181 and 185 having ring shapes are inserted between the bottom surface of the first spacer 171 and the base 110 and between the upper surface of the second spacer 175 and the housing 120, respectively.

Inner peripheral portions of the first and second springs 181 and 185 are integrally formed with the bobbin 140. As the current being applied to the coil 150 is shut off, the bobbin 140 is moved down by the first and second springs 181 and 185, so that the bobbin 140 returns to its initial position.

Although the embodiment shows the first and second springs 181 and 185, it is also possible to provide only one of the first and second springs 181 and 185.

An outer peripheral portion of the horizontal plate 131, which is arranged between adjacent vertical plates 137 of the yoke 130, has a curvature corresponding to that of the vertical wall 134. In addition, a vertical connection plate 139 that connects the adjacent vertical plates 137 to each other is provided on the outer peripheral portion of the horizontal plate 131 in a curved shape. The vertical connection plate 139 prevents penetration of impurity and improves the aesthetic appearance of the lens driving apparatus.

INDUSTRIAL APPLICABILITY

The lens driving apparatus according to the embodiment can be manufactured in a small size, and can be applied to various electronic appliances equipped with a camera function.

What is claimed is:
1. A lens driving apparatus comprising:
a base;
a yoke disposed on the base and including a horizontal plate having a polygonal shape and a vertical plate extended from the horizontal plate;
a bobbin installed in the yoke;
a coil disposed around the bobbin and including a polygonal structure having at least eight outer peripheral surfaces;
an upper spring coupled to an upper portion of the bobbin;
a lower spring coupled to a lower portion of the bobbin; and
a magnet fixed to an inner surface of the vertical plate of the yoke,
wherein the magnet includes a plurality of magnets,
wherein the magnets are disposed at corners of the yoke,
wherein each magnet has a pillar structure having an angular horizontal cross-section, and
wherein, on an outer peripheral surface of the coil, an area facing the magnets is smaller than an area that does not face the magnets.
2. The lens driving apparatus as claimed in claim 1, wherein at least one plane of the magnets that faces the coil has a curvature identical to a curvature of the coil.
3. The lens driving apparatus as claimed in claim 1, wherein the yoke further includes a vertical wall that extends from an inner peripheral portion of the horizontal plate.
4. The lens driving apparatus as claimed in claim 1, wherein the horizontal plate of the yoke has a rectangular shape.
5. The lens driving apparatus as claimed in claim 1, wherein the coil has an octagonal structure.
6. The lens driving apparatus as claimed in claim 1, wherein, on the outer peripheral surface of the coil, the area facing the magnets is greater than 20% of the outer peripheral surface of the coil and smaller than 50% of the outer peripheral surface of the coil.
7. The lens driving apparatus as claimed in claim 1, wherein each of the magnets includes an upper surface, a lower surface, and side surfaces including at least three flat planes not facing the coil, wherein the side surfaces of the magnets are fixed within the yoke.
8. The lens driving apparatus as claimed in claim 7, wherein the at least three flat planes of each magnet are disposed between the yoke and the at least eight outer peripheral surfaces of the coil in a horizontal direction.
9. An electronic appliance comprising a lens driving apparatus according to claim 1.
10. A lens driving apparatus comprising:
a base;
a metal yoke disposed on the base and including a horizontal plate having a polygonal shape and a vertical plate extended from an outer peripheral portion of the horizontal plate;
a bobbin installed in the metal yoke and configured to be coupled with a lens module;
a coil disposed around the bobbin and having an octagonal structure;
a magnet disposed at corners of the metal yoke, wherein the magnet includes four magnets, and each magnet includes an upper surface, a lower surface, and side surfaces including a first plane that faces the coil and a plurality of flat planes that do not face the coil;
an upper spring coupled to an upper portion of the bobbin; and
a lower spring coupled to a lower portion of the bobbin,
wherein each magnet has a pillar structure having an angular horizontal cross-section,
wherein the first plane of each magnet faces an outer peripheral surface of the coil in a horizontal direction, and
wherein, on the outer peripheral surface of the coil, an area facing the four magnets is smaller than an area that does not face the four magnets.
11. The lens driving apparatus according to claim 10, wherein an inner lateral surface of the vertical plate is flat, and wherein each of the four magnets is coupled to the inner lateral surface of the vertical plate of the metal yoke.
12. The lens driving apparatus according to claim 11, wherein the plurality of flat planes that do not face the coil are disposed at the inner lateral surface of the vertical plate of the metal yoke.
13. The lens driving apparatus according to claim 11, wherein the plurality of flat planes that do not face the coil include at least three flat planes.
14. The lens driving apparatus according to claim 11, wherein an outer portion of the lower spring is supported on the base.
15. The lens driving apparatus according to claim 10, wherein, on the outer peripheral surface of the coil, an area facing the magnets is greater than 20% of the outer peripheral surface of the coil and smaller than 50% of the outer peripheral surface of the coil.

16. The lens driving apparatus according to claim 13, wherein a vertical wall is extended from an inner peripheral portion of the horizontal plate.

17. The lens driving apparatus according to claim 16, wherein the coil faces the vertical wall.

18. The lens driving apparatus according to claim 16, wherein the coil and the magnets are disposed between the vertical wall and the vertical plate of the metal yoke.

19. The lens driving apparatus according to claim 16, wherein the coil, the first plane of each magnet facing the coil, and the vertical wall all have the same curvature.

20. The lens driving apparatus according to claim 16, wherein the bobbin is installed at an inner portion of the vertical wall of the yoke.

21. The lens driving apparatus as claimed in claim 11, wherein, for each magnet, the plurality of flat planes that do not face the coil are disposed between the yoke and the coil in a horizontal direction.

22. An electronic appliance comprising the lens driving apparatus according to claim 10.

23. The lens driving apparatus as claimed in claim 7, wherein the side surfaces of each magnet includes a first plane that faces the coil in a horizontal direction.

24. The lens driving apparatus as claimed in claim 7, wherein the side surfaces of each magnet includes a first plane that faces the coil,
wherein the at least three flat planes include a second plane opposite to the first plane, and
wherein an area of the second plane is smaller than an area of the first plane.

25. The lens driving apparatus as claimed in claim 10, wherein the plurality of flat planes include a second plane opposite to the first plane,
wherein an area of the second plane is smaller than an area of the first plane, and
wherein the yoke, the magnet, and the coil are overlapped in the horizontal direction perpendicular to a moving direction of the bobbin.

* * * * *